US 6,950,432 B2

(12) United States Patent
Chen et al.

(10) Patent No.: US 6,950,432 B2
(45) Date of Patent: Sep. 27, 2005

(54) ARCHITECTURE FOR DENSE MULTICAST NETWORKS WITH PROVISIONED ROUTES

(75) Inventors: Shiwen Chen, Marlboro, NJ (US); Harumine Yoshiba, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 103 days.

(21) Appl. No.: 10/445,380

(22) Filed: May 23, 2003

(65) Prior Publication Data

US 2004/0258066 A1 Dec. 23, 2004

(51) Int. Cl.$^7$ ................................................. H04L 12/56
(52) U.S. Cl. ..................... 370/390; 370/392; 370/432; 370/474; 370/475; 370/221
(58) Field of Search ................................ 370/390, 432, 370/392–393, 312, 351, 216–228, 229–230, 235–238

(56) References Cited

U.S. PATENT DOCUMENTS

| | | | |
|---|---|---|---|
| 6,262,982 B1 * | 7/2001 | Donahue et al. ............ | 370/352 |
| 6,321,270 B1 * | 11/2001 | Crawley ..................... | 709/238 |
| 6,331,983 B1 * | 12/2001 | Haggerty et al. ........... | 370/400 |
| 6,556,544 B1 * | 4/2003 | Lee ............................ | 370/256 |
| 6,567,851 B1 * | 5/2003 | Kobayashi .................. | 709/228 |
| 6,633,544 B1 * | 10/2003 | Rexford et al. ............. | 370/238 |

OTHER PUBLICATIONS

"Aggregated Multicast: an Approach to Reduce Multicast State", UCLA CSD TR #010012, Aiguo Fei, et al., 11 pages.
"An Architecture for Scalable QoS Multicast Provisioning", UCLA CSD TR #010030, Jun–Hong Cui, et al., 21 pages.
"End to End Aggregation of Multicast Addresses", R. Briscoe, et al., Internet Draft of Internet Engineering Task Force (IEFT), Nov. 21, 1997, 22 pages.
"A Protocol to Improve the State Scalability of Source Specific Multicast", Jun–Hong Cui, et al., 6 pages.
"Aggregated Multicast with Inter–Group Tree Sharing", Aiguo Fei, et al., 15 pages.
"Aggregated Multicast for Scalable QoS Multicast Provisioning", Mario Gerla, et al., 14 pages.
"Exploiting the Bandwidth–Memory Tradeoff in Multicast State Aggregation", Pavlin Ivanov Radoslavov, et al., 11 pages.
"Aggregated Hierarchical Multicast for Active Networks", Tilman Wolf, et al., Washington University in St. Louis School of Engineering & Applied Science, Feb. 23, 2001, 17 pages.

* cited by examiner

Primary Examiner—Brian Nguyen
Assistant Examiner—Tri H. Phan
(74) Attorney, Agent, or Firm—Harness, Dickey & Pierce, PLC (57) ABSTRACT

A multicasting network route provisioning system for use in allowing an in-session multicast application to switch its path on need includes a datastore of multicast addresses operable to route multicasting traffic over different network paths. It also includes a datastore of multicasting sessions having flows of various flow patterns, wherein a flow pattern is defined in terms of a set of source and destination network nodes, and corresponds to multiple routing network paths. Further, a session management module is adapted to aggregate multicasting session flows by allocating multicast addresses to multicasting sessions based on correspondence between the network paths and flow patterns of the multicasting sessions, thereby ensuring that flow patterns corresponding to different sets of network paths do not share a same multicast address.

52 Claims, 5 Drawing Sheets

ARCHITECTURE FOR DENSE MULTICAST NETWORKS WITH PROVISIONED ROUTES

FIELD OF THE INVENTION

The present invention generally relates to network resource management systems and methods, and particularly relates to route provisioning at an application level to address the needs of a network having large amounts of multicasting traffic.

BACKGROUND OF THE INVENTION

Networks having large amounts of multicasting sessions as primary application traffic face many issues, including path management, fault tolerance, and routing performance and quality of service. Attempts to address these issues have often concentrated on implementing solutions at a network level. Path aggregation, for example, using shared multicast trees has been implemented at a network level during network router configuration. However, this solution fails to yield centralized, dynamic control of the network that provides a powerful tool for network resource management, particularly with regard to high levels of multicasting traffic.

What is needed is a system and method of provisioning routes at the application level that can apply the principles of path aggregation to multicast address assignment and network router control to more successfully manage network resources in the context of high levels of multicasting traffic. The present invention provides such a solution.

SUMMARY OF THE INVENTION

In accordance with the present invention, a multicasting network route provisioning system for use in allowing an in-session multicast application to switch its path on need includes a datastore of multicast addresses operable to route multicasting traffic over different network paths. It also includes a datastore of multicasting sessions having flows of various flow patterns, wherein a flow pattern is defined in terms of a set of source and destination network nodes, and corresponds to multiple routing network paths. Further, a session management module is adapted to aggregate multicasting session flows by allocating multicast addresses to multicasting sessions based on correspondence between the network paths and flow patterns of the multicasting sessions, thereby ensuring that flow patterns corresponding to different sets of network paths do not share a same multicast address.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

By way of overview, it may be helpful to consider a network backbone of six routers. In this case, there are six possible source nodes, and each unique set of nodes that can be formed with each source node represents a unique flow pattern. For six backbone routers, there are one-hundred eighty-six possible flow patterns, wherein a flow is defined as a multicast session from one multicast application instance to other application instances in the same network, which may include multiple subnets. Thus, if four-hundred flows are routed from these six nodes, then it is obvious that multiple flows will share a same flow pattern. The present invention in part recognizes that it is desirable to aggregate these flows sharing same flow patterns and thereby reduce the number of flows to be computed. Potential benefits of this aggregation include computation reduction, reduced routing overhead, reduced routing table size, and faster, more manageable packet switching and routing, since the routing cost is rendered independent of the number of multicast sessions/flows, and is instead bounded by the network size.

The present invention further in part recognizes the benefit of generating a shared multicast tree for patterns with same sets of nodes, regardless of the flow sources. For example, the total number of shared trees covering all flow patterns for a six node network is fifty-seven. The potential benefits in this case include faster and easier backup routing. In particular, it is possible to limit the number of multicasting addresses on a six node backbone to fifty-seven, and the routing can thus be source independent. This benefit stems from the ability of routers to switch packets according to multicast group address only, instead of <source IP, group IP>, and simply forward a packet received on one interface to the rest of its interfaces that join the same group. Also, when a link becomes discontinuous, then network reconfiguration is minimized because the disconnected or "pruned" sub-trees merely need to be reconnected or "unprune" since forwarding at routers is direction independent.

The present invention obtains the aforementioned benefits in part by accomplishing aggregation of flows of a same flow pattern by allowing them to use a common subset of multicast addresses, and ensuring that flows of different patterns do not share a same multicast address. The degree of aggregation is controlled by the ratio of how many multicast addresses are allowed to be allocated to a same flow pattern. The extreme case is total aggregation, such that only one multicast address is allocated for all flows sharing a same flow pattern. However, one advantage of multiple address mapping to a same flow pattern is that a flow has the flexibility of switching to another path by switching its multicast address whenever necessary. In the case of congestion, for example, a multicasting session may switch to another path of the same flow pattern by switching to another multicast address assigned to the new path. Thus, allocated multicast addresses are actually mapped into certain provisioned multicast routes. As a result, route performance information can be easily retrieved. Different flows, however, can still be distinguished with different source Internet Protocol (IP) addresses. For example, Internet Group Management Protocol version 3 (IGMP v3) enables a receiving host to receive packets specifically from a source, instead of all packets with the same IP multicast address. Also, flows may use different User Datagram Protocol (UDP) ports as distinguishing features. As a result, multicast receivers can listen to multiple multicasting sessions on the same multicasting address, and ignore all multicasting sessions not originating at the multicasting source from which they have requested multicast data. The processes and approaches of the present invention are further described below with reference to FIGS. 1–5.

Figure 1:
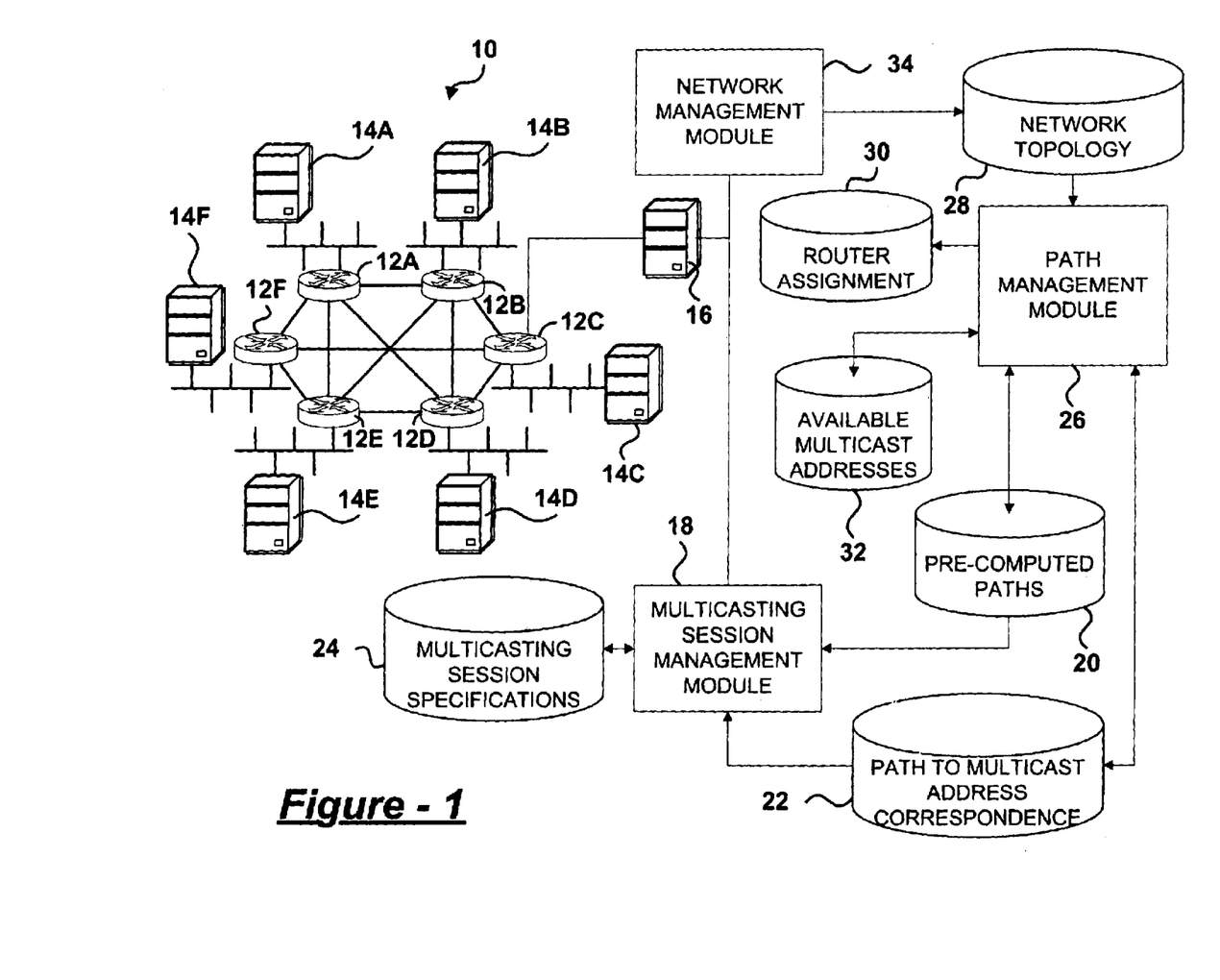
FIG. 1 is a block diagram illustrating a communications network having a multicasting session management server providing a route provisioning system in accordance with the present invention.

FIG. 1 illustrates a communications network 10 composed of multicast routers 12A–12F that support provisioned multicast routing between multicasting applications 14A–14F performed by multicasting session management server 16, which provides a route provisioning system in accordance with the present invention. Network 10 may be, for example, an Intranet, such as a secure enterprise network, and/or a subnet of the Internet operating under centralized control of the multicasting session management server 16. When an application (not shown) initiates a new multicasting session, a proper multicast address must be allocated. It should be readily understood that a multicasting application initiating a session may reside within a subnet attached to a routers on the routing backbone, and that the same may be true for receiving applications. In general, a requesting application may communicate a new session request to server 16, which in turn may employ multicasting session management module 18 to analyze the flow pattern of the requested session, allocate a multicasting address assigned to a non-link-failure case path of the flow based on session bandwidth requirements and monitored path performance, and manage the session specifications utilizing and/or maintaining various information resources. These resources may include datastore 20 of pre-computed paths, datastore 22 of path to multicast address correspondence, and datastore 24 of multicasting session specifications. The session specifications may include information identifying session participants that allow server 16 to communicate with session participants when the need arises.

Server 16 may further employ path management module 26 to affect network router control and/or develop and maintain datastore 20 and datastore 22 by pre-computing the possible paths of the network, including cases of single-link failure discontinuity, and assigning a multicast address to each non-link-failure case path and its associated link-failure case alternative paths. The resulting data may be accumulated in accordance with link-failure conditions in a datastore as illustrated below in Table 1, and this data may be used to provision each network router accordingly.

TABLE 1

| Path ID | Main path | Backup path for link (1, 2) failure | Backup path for link (1, 3) failure | Backup path for link (1, 4) failure | ... | Backup path for (3,5) failure | ... |
|---|---|---|---|---|---|---|---|
| 239.1.1.1 | –link (1, 2) –link (1, 3) –link (3, 5) | –(1, 3) –(3, 2) –(3, 5) | –(1, 2) –(2, 3) –(3, 5) | Null (or N/A) | ... | (1, 2) (1, 3) (2, 4) (4, 5) | ... |
| 239.1.1.2 | ... | ... | ... | | | | |

As a result, each network router may be adapted to route multicasting traffic according to the non-link-failure case in normal conditions, to detect a link-failure case, and to route according to the detected link-failure case upon detection of the link-failure. Since the same multicast address is used for a non-link-failure case and each of its associated link-failure cases, it is possible for the routers to accommodate a link-failure by switching to an alternative route without requiring a change in multicasting address for the session. Generally, it may be sufficient to pre-compute and accommodate each single link-failure case for each non-link-failure case path, but multiple link failures may additionally be considered in alternative implementations.

Path management module 26 may further develop and/or utilize various information resources that may include datastore 28 storing a network topology, datastore 30 of router assignments, and/or datastore 32 of available multicast addresses. Server 16 may still further employ network management module 34 to develop a network topology based on input from network management personnel and/or detection of additional network components.

Figure 2:
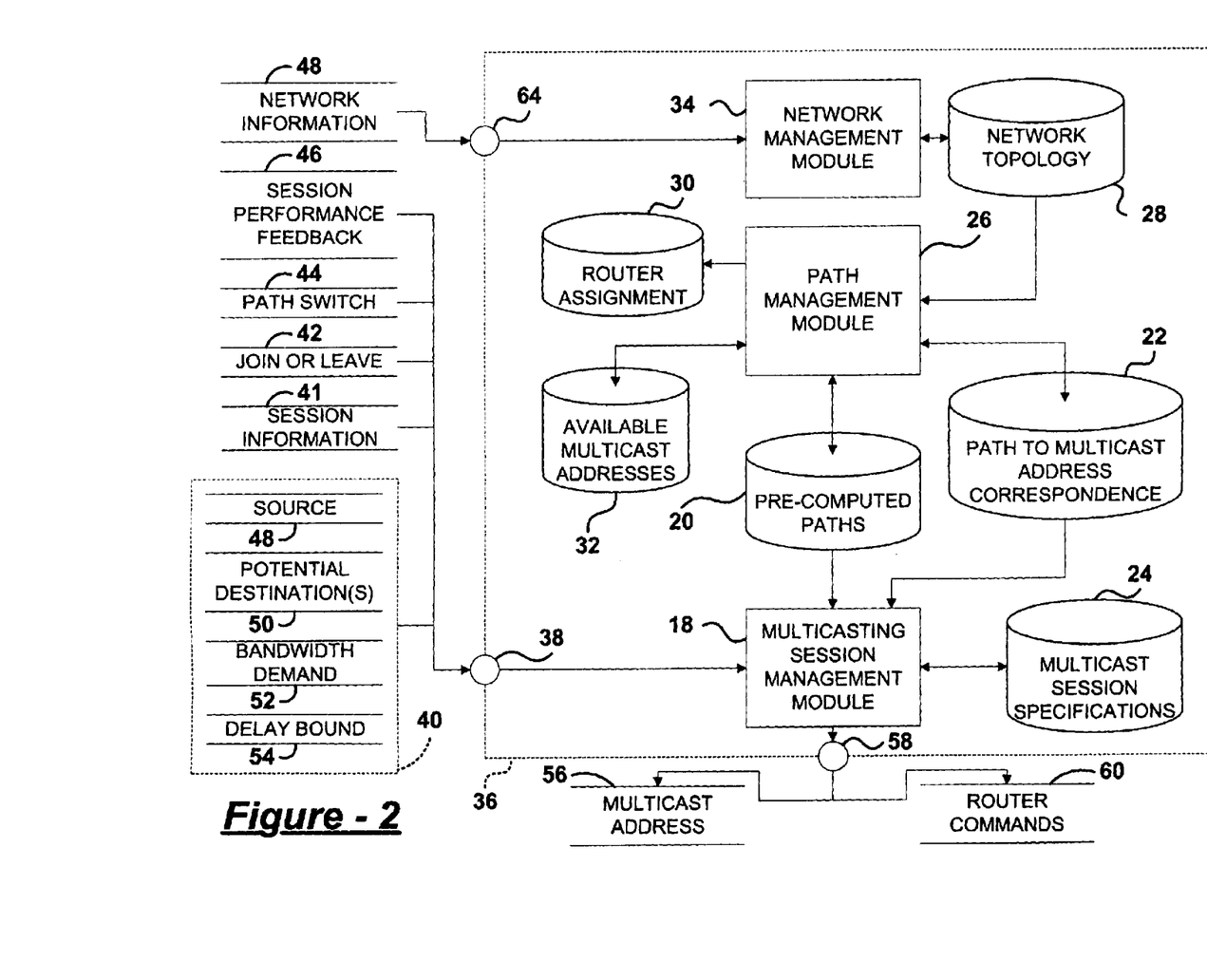
FIG. 2 is a block diagram illustrating a route provisioning system in accordance with the present invention.

FIG. 2 illustrates operation of route provisioning system 36. Therein, network interface input 38 may be receptive of requests from multicasting applications, including new session request 40, session information request 41, session join and/or leave request 42, and/or path switch request 44. Network interface input 38 may further be receptive of session performance feedback 46 from session participants, which system 36 may receive, for example, by virtue of including itself in every multicasting session, thereby ensuring that the session feedback is routed to system 36. A new session request 40 may include a source identification 48, potential destinations 50, bandwidth demand 52, delay bound 54, and/or additional parameters. A join and/or leave request 42 may include a session identification, a source identification, a location, a destination, a multicast address, and/or additional information sufficient to identify the multicast session and the joining and/or leaving application. A path switch request 44 from a participant in a multicasting session may contain similar information sufficient to identify a multicasting session, as may session information request 41 and session performance feedback 46 from multicasting session participants.

In response to a new session request 40, multicasting session management module 18 may be adapted to analyze the session flow pattern to identify a plurality of potential network paths, and to select an unused path for the session, thereby allocating an unused multicast address, only when a new path is needed. The need for a new path may result from insufficient bandwidth on existing, respective paths, priority requirement, path performance, and additional reasons.

Thus, sessions having same flow patterns may have different multicast addresses and associated paths, or may have identical multicast addresses and associated paths as the need arises. Session management module 18 may utilize datastore 20 of pre-computed paths when identifying the plurality of potential paths for the flow pattern specified by source identification 48 and potential destinations 50, and may further allocate an address of datastore 22 of multicast addresses to path correspondence based on a selected path for the session. Session management module 18 further maintains datastore 24 of session information and, in response to session information request 41 from a session participant, communicates the allocated multicast address 56 to the requesting multicasting application via network interface output 58. In one embodiment, the allocation is performed by indirect reference wherein a session is assigned to a pre-computed, non-link-failure path corresponding to the session's flow pattern. Thus, a pointer to a path object may be stored in datastore 24, and a complimentary lookup function may obtain the identity of the multicast address assigned to the path that is in turn assigned to the session when identifying the multicast address allocated to the session. In an alternative embodiment, the multicast address may be allocated by direct reference by storing the multicast address for the selected path in datastore 24, and using a complementary lookup function to obtain the allocated address directly from datastore 24.

In response to a session join and/or leave request 42, session management module 18 may be adapted to amend the session information in datastore 24 by adding or removing the session participant and, if necessary, identify a new flow pattern for the session based on the new set of session participants and their respective locations in the network. If a change in flow pattern is identified, then a different multicast address may be allocated based on a newly selected path of the new flow pattern; also, session information may be amended to reflect the change in the multicast address and/or selected path. Session participants, which include the requesting application in the case of a join request, may thus be notified of the newly allocated multicast address 56, which may be synonymous with the newly selected path identity. Otherwise, a requesting application may be notified of a multicast address 56 already allocated to the session.

Session management module may be adapted to select a new path for one or more sessions in various conditions, amend session specifications in datastore 24 to reflect the new multicast address assigned to the newly selected path, and communicate the new multicast address 56 to session participants. For example, in response to a path switch request 44, session management module may select a new path for the session that accommodates the needs of the session. Also, session management module 18 may be adapted to proactively identify the need for a new path for a session based on session performance feedback 46 absent a path switch request, in which case session management module may select a new path for the session that corresponds to the session flow pattern. Further, and especially in alternative implementations where network routers do not automatically accommodate link failure cases, session management module 18 may be adapted to detect a network discontinuity affecting a utilized path via normal routing protocols, and to select new paths for affected sessions based on the session flows and corresponding paths pre-computed to accommodate the discontinuity and having different multicast addresses assigned to them than are assigned to the non-link failure case paths. Thus, session path switching can be accomplished efficiently through multicast address reassignment in various ways in accordance with the present invention.

Path management module 26 may be adapted to utilize a network topology of datastore 28 to pre-compute network paths, including cases of discontinuity as detailed above. Path management module 26 may also be adapted to establish the pool of available multicast addresses of datastore 32, and further establish path to multicast address correspondence of datastore 22 by assigning the multicast addresses to the pre-computed paths; this process may include generating shared multicast trees for flow patterns with same sets of nodes. Path management module 26 may further be adapted to determine router assignments of datastore 30 based on the network topology of datastore 28 and the path to multicast address correspondence of datastore 22, and to communicate appropriate router commands 60 to network routers via network interface output 58, thereby providing the routers with the necessary routing tables to support multicast routing in accordance with the present invention. In an implementation assigning a multicast address to a non-link-failure case and each of its associated link-failure cases, router commands 60 may be ordered to provide alternative sets of routing tables with link-failure based conditions for accessing the alternative sets of tables.

Network management module 34 may be adapted to receive network information 62 from network administrators via user interface input 64. Network interface module 34 may further be adapted to develop and maintain the network topology of datastore 28 based on the network information. Thus, network administrators may, for example, indicate addition of a router to the network, which may cause an adjustment to the network topology, pre-computation of additional paths, assignment of additional addresses to the paths, and allocation of the assigned addresses to take advantage of the additional paths. Other network alterations can be further accommodated, and it should be readily understood that network information may be alternatively or additionally auto-detected through a network layer, which may correspond to a supervisory channel adapted to auto-detect addition and/or removal of network components; auto-detection of network topology changes may further employ means of network management, for example, the Simple Network Management Protocol (SNMP) or other network management protocol.

Figure 3:
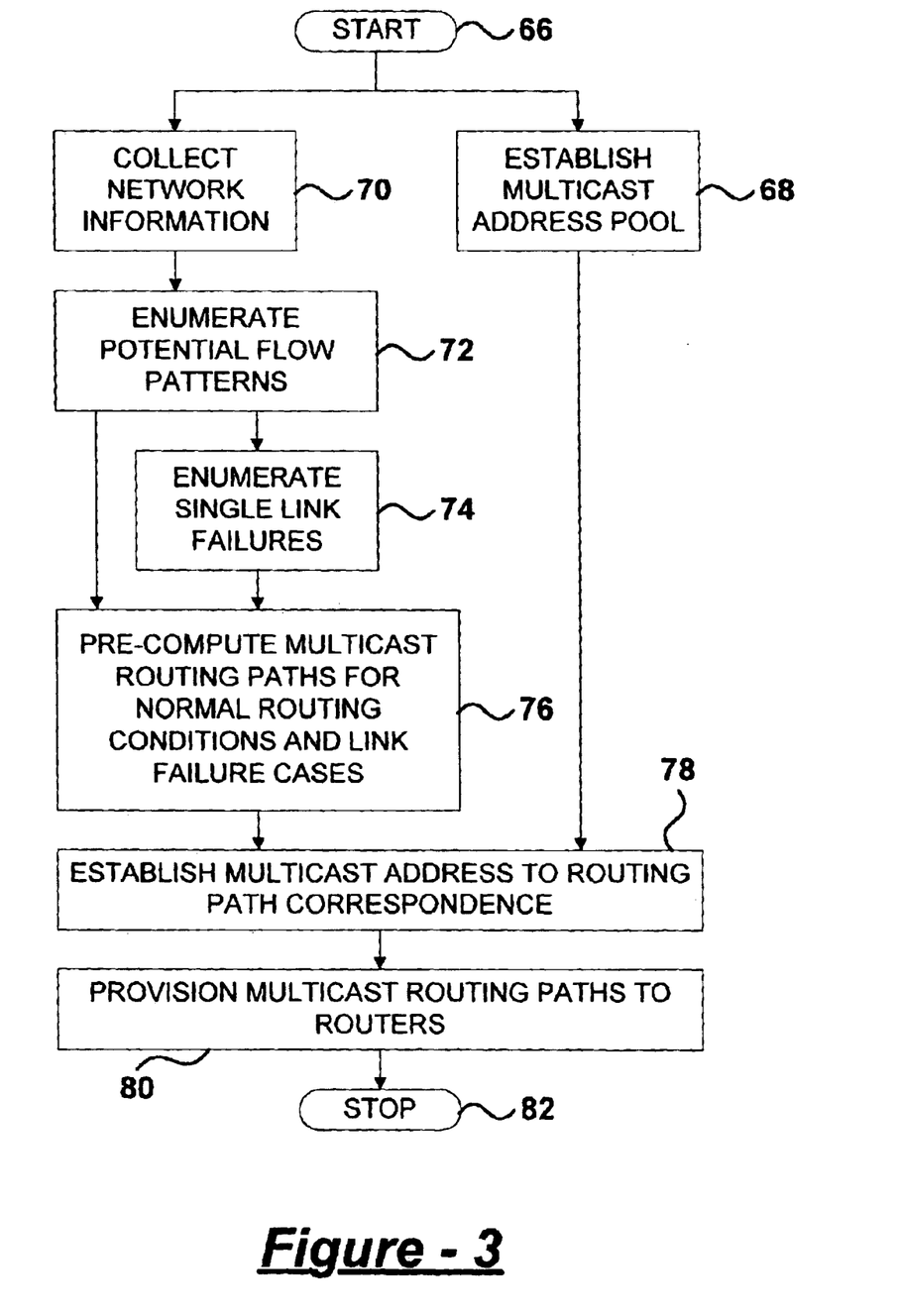
FIG. 3 is a flow diagram illustrating a path management portion of a route provisioning method in accordance with the present invention.

FIG. 3 illustrates a path management portion of a route provisioning method in accordance with the present invention. Beginning at 66, the method may include establishing a multicast address pool at step 68, which may be accomplished by manual configuration, or by automated batch reservation from a multicast address allocation server as with the Multicast Address Dynamic Allocation Protocol (MADCAP). The method may also include collecting network information at step 70, which may correspond to receiving a network topology corresponding to a data structure of edges and nodes. It may alternatively or additionally include receiving edge and node information sufficient to construct the network topology. The method may further include enumerating all of the potential flow patterns based on the network topology at step 72, and enumerating all of the single link failures at step 74. Steps 74 and 72 may include instantiating data representing all of the sets of nodes of the network in normal and link failure conditions. Then, the method may include pre-computing multicast routing paths for normal and link failure cases based on the network topology at step 76. Step 76 may include instantiating data representing each path corresponding to a particular flow, or set of nodes, and relating in memory the path data to the flow data using one or more pointers.

With the network paths pre-computed and organized by actual and/or potential multicast session flows, the pool of available multicast addresses established in step 68 may be allocated to the paths in step 78 in a manner that ensures that no two different flow patterns have the same multicast address assigned to one of their associated paths. Step 78 may correspond to allocating one or more multicast addresses to each non-link failure path, while ensuring that no two non-link-failure paths are assigned the same multicast address. Once the multicast addresses have been assigned to the non-link-failure paths of the network, it may be possible to provision the multicast routing paths to the network routers at step 80 based on the multicast address to path correspondence and the network topology. Multiple routing tables for a multicast address may be constructed at each router to accommodate the various link failure cases with link-failure based conditions provided to interrelate the alternative routing tables. Once the paths have been pre-computed and router assignments made, it may not be necessary, absent alterations to the network topology (other than link-failures), to change any routing assignments; thus, the path management portion of the route provisioning method of the present invention ends at 82.

Figure 4:
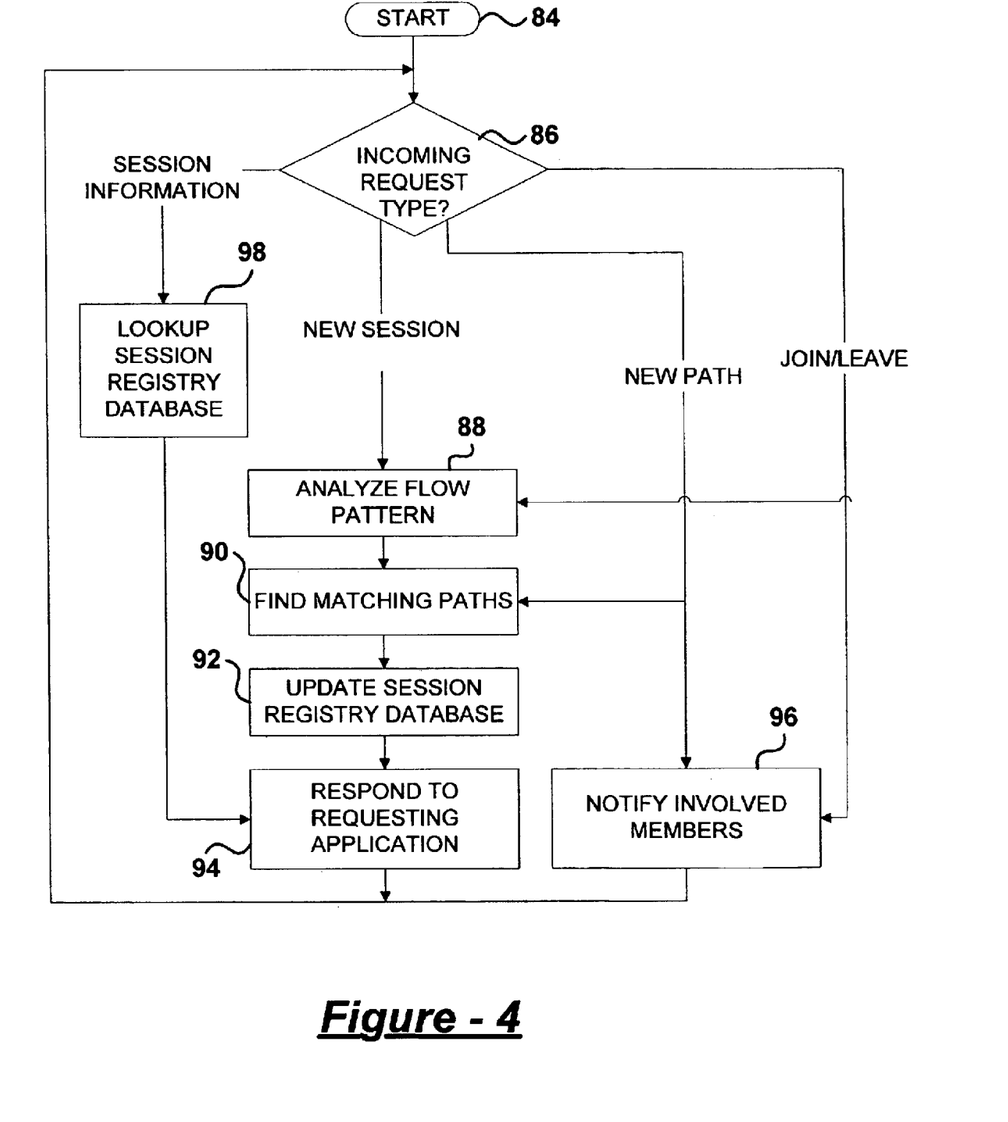
FIG. 4 is a flow diagram illustrating a session management portion of a route provisioning method in accordance with the present invention.

Turning to FIG. 4, a multicasting session management portion of the route provisioning method of the present invention begins at 84 with receipt of an incoming request from a multicasting application and/or network continuity and/or session performance sub-system, and the response process depends on the type of request received as at 86. For example, if the received request corresponds to a new session request from a multicasting application, then the response process may include analyzing the flow pattern of the session at step 88, which may be a set of member network nodes identified in the request, to find one or more matching paths at step 90, updating the session registry with session information that includes a multicast address identifying the next available path of the flow pattern, and responding to the requesting application by indicating that the multicasting session has been established and/or by providing the allocated multicast address at step 94. Also, if the received request corresponds to a join and/or leave request from a multicasting application, then the response process may include updating the session registry database at step 92, analyzing the updated session's flow pattern at step 88 to find a next available matching path at step 90, and responding to the requesting application at step 94 by, for example, providing the allocated multicast address in the case of a join request; if a new flow pattern results from the change in the session information, then the response process may further include notifying the session participants of the new multicast address at step 96. Furthermore, if the received request corresponds to a new path request from a multicasting application or network continuity and/or session performance monitoring sub-system, then the response process may include finding the next available path for the session flow at step 90, updating session information at step 92 based on the new multicast address, and notifying the session participants at step 96, which may include a requesting multicasting application at step 94. Finally, multicasting session participants may request session information; thus the process may include looking up the session information at step 98 and responding to the requesting application at step 94 by providing the session information, such as the allocated multicast address.

Figure 5:
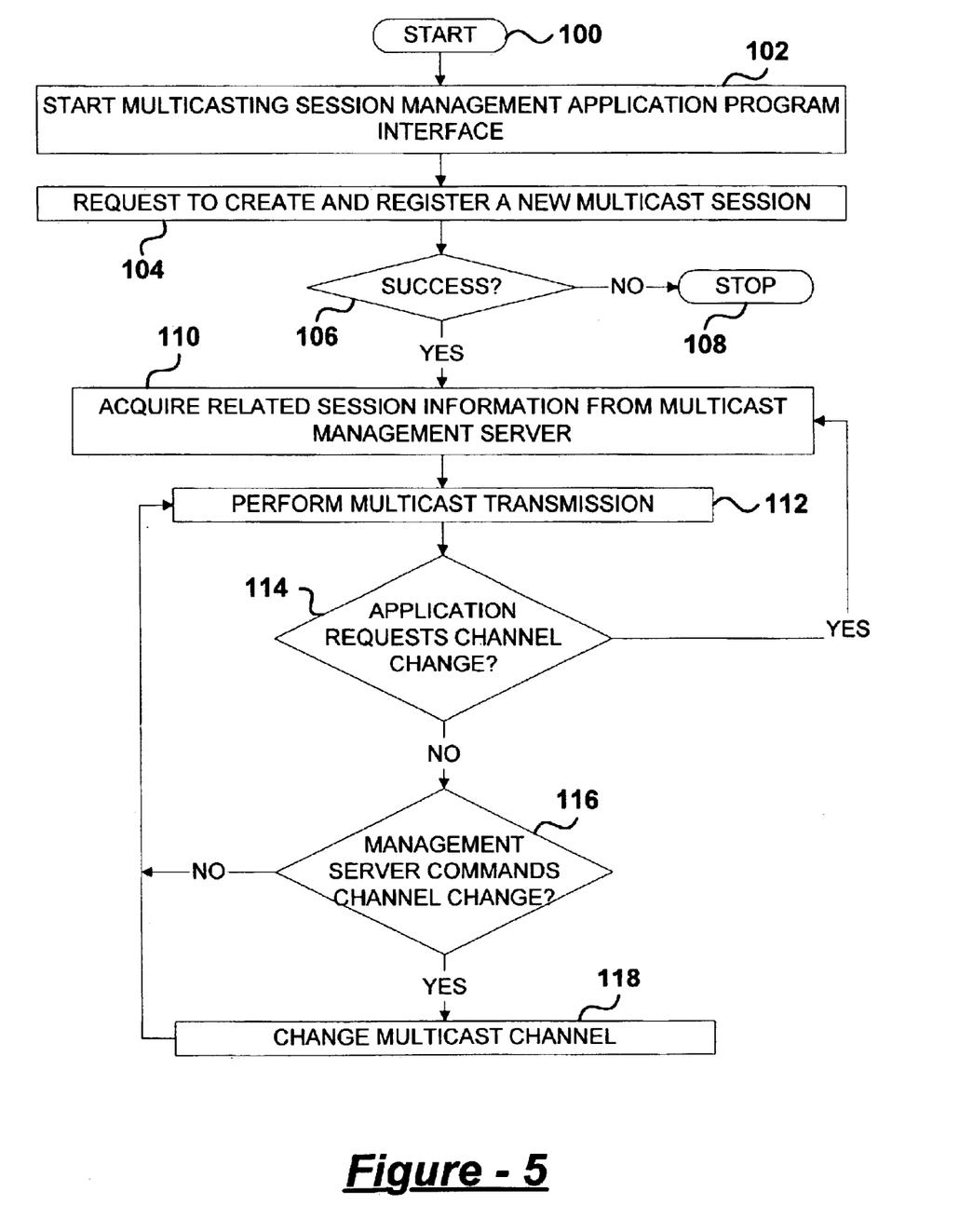
FIG. 5 is a flow diagram illustrating a method of operation for a multicasting application in accordance with the present invention.

FIG. 5 illustrates a method of operation for a sending multicasting application requesting a new session in accordance with the present invention. Beginning at 100, the method includes starting a multicasting session management application program interface at step 102, and requesting to create and register a new multicasting session at step 104. If the request is not successful as at 106 the method ends at 108. If, however, the request is successful, then the multicasting application may request and receive session information from the multicast management server at step 110. Then, the multicasting application may perform the multicast transmission at step 112. If a receiving application requests a multicast channel change as at 114, then processing returns to step 110, and the new multicast address is used to continue transmission at step 112. If the management server commands a channel change as at 116, then the multicasting application changes the multicasting channel as commanded at step 118, and processing returns to step 112.

A method of operation for a receiving multicasting application is similar to that of the sending multicasting application of FIG. 5. However, the receiving multicasting application need not request a new multicasting session, and receives rather than performs multicast transmission. Both receiving and sending multicasting applications may additionally share performance feedback with one another and with a session manager, and may additionally communicate a path switch request for a session to the session manager if the performance falls too low.

The description of the invention is merely exemplary in nature and, thus, variations that do not depart from the gist of the invention are intended to be within the scope of the invention. For example, it may be the case that the multicasting sessions are known in advance of the network path pre-computation and, in this case, the paths for the sessions may be pre-selected so that multicast addresses can be assigned to paths in view of the known needs relating to the network transmission resources. In this case, the path manager may essentially perform assignment of multicast addresses to paths and allocation of multicast addresses to sessions in one step, thus also being a part of the session management module, and sending multicasting applications need not request new sessions. Also, it may be the case that the multicast addresses are not assigned ahead of time to network paths, but may be drawn from and returned to a pool of available multicasting addresses as the need arises, such that the multicast addresses are assigned to sessions in a manner that merely ensures that a multicast address assigned to a session of one source-independent flow pattern is not also assigned to a session of another source-independent flow pattern. Further, network paths may be computed dynamically rather than pre-computed, and network routers commanded and controlled in a complementary dynamic fashion. Still further, functions of one module described herein may be moved to another module, and implemented separately or integrated together in various combinations. Further still, multiple servers disposed at different nodes of the network may be employed to separately perform different modules and mutually communicate to accomplish the system and method of the present invention. Yet further still, combinations and orders of components and steps of the present invention may be varied to accommodate varying operation among multicasting applications, routers, and network structures and/or protocols. Such variations are not to be regarded as a departure from the spirit and scope of the invention.

What is claimed is:

1. A multicasting network route provisioning system for use in allowing an in-session multicast application to switch its path on need, comprising:

a datastore of multicast addresses operable to route multicasting traffic over different network paths;

a datastore of multicasting sessions having flows of various flow patterns, wherein the flow pattern is defined in terms of a set of source and destination network nodes, and corresponds to multiple routing network paths; and a session management module adapted to aggregate multicasting session flows by allocating multicast addresses to multicasting sessions based on correspondence between the network paths and flow patterns of the multicasting sessions, thereby ensuring that flow patterns corresponding to different sets of network paths do not share a same multicast address, wherein said multicasting session management module is adapted to identify correspondence between flow patterns on a source-independent basis that considers factors including one or more of source, destinations, and application requirements relating to network transmission resources.

2. The system of claim 1, wherein said multicasting session management module is adapted to allow multicasting sessions having a same flow pattern to have different multicast addresses.

3. The system of claim 1, wherein said multicasting session management module is adapted to allow multicasting sessions having a same flow pattern to share a same multicast address.

4. The system of claim 1, wherein said multicasting session management module is adapted to communicate multicasting session information to requesting multicasting session participants.

5. The system of claim 1, wherein said multicasting session management module is adapted to communicate a change in multicasting session information to multicasting session participants.

6. The system of claim 1, wherein said datastore of network paths includes pre-computed network paths that account for network discontinuities.

7. The system of claim 1, further comprising a path management module adapted to pre-compute the network paths based on a network topology.

8. The system of claim 1, further comprising a path management module adapted to establish multicast address to network routing path correspondence.

9. The system of claim 1, further comprising a path management module adapted to provision multicast routing paths to routers.

10. The system of claim 1, further comprising a network management module adapted to maintain a network topology.

11. A multicasting network route provisioning system for use in allowing an in-session multicast application to switch its path on need, comprising:

a datastore of multicast addresses operable to route multicasting traffic over different network paths;

a datastore of multicasting sessions having flows of various flow patterns, wherein the flow pattern is defined in terms of a set of source and destination network nodes, and corresponds to multiple routing network paths; and a session management module adapted to aggregate multicasting session flows by allocating multicast addresses to multicasting sessions based on correspondence between the network paths and flow patterns of the multicasting sessions, thereby ensuring that flow patterns corresponding to different sets of network paths do not share a same multicast address, wherein said multicasting session management module is adapted to switch a path of a multicasting session by allocating to the multicasting session a different multicast address operable to route multicasting data over a different path corresponding to the flow pattern of the multicasting session.

12. The system of claim 5, wherein said datastore of network paths includes pre-computed network paths that account for network discontinuities.

13. The system of claim 5, further comprising a path management module adapted to pre-compute the network paths based on a network topology.

14. The system of claim 11, further comprising a network management module adapted to maintain a network topology.

15. A multicasting network route provisioning system for use in allowing an in-session multicast application to switch its path on need, comprising:

a datastore of multicast addresses operable to route multicasting traffic over different network paths;

a datastore of multicasting sessions having flows of various flow patterns, wherein the flow pattern is defined in terms of a set of source and destination network nodes, and corresponds to multiple routing network paths; and a session management module adapted to aggregate multicasting session flows by allocating multicast addresses to multicasting sessions based on correspondence between the network paths and flow patterns of the multicasting sessions, thereby ensuring that flow patterns corresponding to different sets of network paths do not share a same multicast address, wherein said multicasting session management module is adapted to adjust multicasting session membership based on a change in session participation, to determine whether a session obtains a new flow pattern based on the change in session participation, to allocate a new multicast address to the session in the event a new flow pattern is determined to be obtained, wherein the new multicast address is operable to route multicasting traffic over a path of the new flow pattern, and to communicate the new multicast address to session participants.

16. The system of claim 15, wherein said datastore of network paths includes pre-computed network paths that account for network discontinuities.

17. The system of claim 15, further comprising a path management module adapted to pre-compute the network paths based on a network topology.

18. The system of claim 15, further comprising a network management module adapted to maintain a network topology.

19. A multicasting network route provisioning system for use in allowing an in-session multicast application to switch its path on need, comprising:

a datastore of multicast addresses operable to route multicasting traffic over different network paths;

a datastore of multicasting sessions having flows of various flow patterns, wherein the flow pattern is defined in terms of a set of source and destination network nodes, and corresponds to multiple routing network paths; and a session management module adapted to aggregate multicasting session flows by allocating multicast addresses to multicasting sessions based on correspondence between the network paths and flow patterns of the multicasting sessions, thereby ensuring that flow patterns corresponding to different sets of network paths do not share a same multicast address, wherein said multicasting session management module is adapted to monitor network path performance based on session feedback from one or more of a network manager, a network component, and a multicasting session participant.

20. The system of claim 19, wherein said datastore of network paths includes pre-computed network paths that account for network discontinuities.

21. The system of claim 19, further comprising a path management module adapted to pre-compute the network paths based on a network topology.

22. The system of claim 19, further comprising a network management module adapted to maintain a network topology.

23. A multicasting network route provisioning system for use in allowing an in-session multicast application to switch its path on need, comprising:

a datastore of multicast addresses operable to route multicasting traffic over different network paths;

a datastore of multicasting sessions having flows of various flow patterns, wherein the flow pattern is defined in terms of a set of source and destination network nodes, and corresponds to multiple routing network paths; and a session management module adapted to aggregate multicasting session flows by allocating multicast addresses to multicasting sessions based on correspondence between the network paths and flow patterns of the multicasting sessions, thereby ensuring that flow patterns corresponding to different sets of network paths do not share a same multicast address, wherein said multicasting session management module is adapted to determine whether a session requires a new path based on one or more of session performance feedback from a session participant and a new path request from the session participant.

24. The system of claim 23, wherein said datastore of network paths includes pre-computed network paths that account for network discontinuities.

25. The system of claim 23, further comprising a path management module adapted to pre-compute the network paths based on a network topology.

26. The system of claim 23, further comprising a network management module adapted to maintain a network topology.

27. A network route provisioning system, comprising:

a path management module adapted to pre-compute network paths based on a network topology, to assign multicast addresses to the pre-computed network paths, and to communicate with network routers to provision routes according to the multicast addresses assigned to the routes;

a datastore of multicasting session specifications identifying flow patterns of multicasting sessions as sets of network source and destination nodes; and a session management module adapted to aggregate multicasting session flows by selecting a path to route a multicasting session in accordance with the flow pattern of the multicasting session, and by communicating the multicast address assigned to the selected path to participants in the multicasting session, wherein said path management module is adapted to pre-compute alternative network paths associated with link-failure cases, to assign a same multicast address to a non-link failure case path and to all of the alternative network paths associated with link-failure cases, and to communicate with network routers to provision the alternative routes with specified activation conditions relating to the link failure cases.

28. A multicasting network route provisioning method, comprising:

pre-computing network paths based on a network topology;

assigning different multicast addresses to the network paths;

selecting a path to route a multicasting session based on correspondence between a flow pattern of the session and the network path, wherein the flow pattern is defined in terms of a set of source and destination network nodes, and corresponds to multiple routing network paths; and identifying correspondence between flow patterns and paths on a source-independent basis that considers factors including one or more of source, destinations, and application requirements relating to network transmission resources.

29. The method of claim 28, further comprising allowing multicast sessions having a same flow pattern to have different multicast addresses.

30. The method of claim 28, further comprising allowing multicasting sessions having a same flow pattern to share a same multicast address.

31. The method of claim 28, further comprising communicating multicasting session information to requesting multicasting session participants.

32. The method of claim 28, further comprising communicating a change in multicasting session information to multicasting session participants.

33. The method of claim 28, further comprising pre-computing an alternative network path to accommodate a link-failure case.

34. The method of claim 28, further comprising assigning a multicast address assigned to pre-computed network path to an alternative network path pre-computed to accommodate a link-failure case.

35. The method of claim 28, further comprising provisioning multicast routing paths to routers by creating routing tables in the network routers that cause the routers to route multicasting traffic according to the multicast addresses assigned to the pre-computed routes.

36. The method of claim 28, further comprising maintaining a network topology.

37. A multicasting network route provisioning method, comprising:

pre-computing network paths based on a network topology;

assigning different multicast addresses to the network paths;

selecting a path to route a multicasting session based on correspondence between a flow pattern of the session and the network path, wherein the flow pattern is defined in terms of a set of source and destination network nodes, and corresponds to multiple routing network paths; and switching a network path of a multicasting session by selecting a different path corresponding to the flow pattern of the multicasting session, and by communicating the multicast address assigned to the different path to a session participant.

38. The method of claim 37, further comprising pre-computing an alternative network path to accommodate a link-failure case.

39. The method of claim 37, further comprising assigning a multicast address assigned to pre-computed network path to an alternative network path pre-computed to accommodate a link-failure case.

40. The method of claim 37, further comprising provisioning multicast routing paths to routers by creating routing tables in the network routers that cause the routers to route multicasting traffic according to the multicast addresses assigned to the pre-computed routes.

41. A multicasting network route provisioning method, comprising:

pre-computing network paths based on a network topology;

assigning different multicast addresses to the network paths;

selecting a path to route a multicasting session based on correspondence between a flow pattern of the session and the network path, wherein the flow pattern is defined in terms of a set of source and destination network nodes, and corresponds to multiple routing network paths; and monitoring network path performance based on session feedback from one or more of a network manager, a network component, and a multicasting session participant.

42. The method of claim 41, further comprising pre-computing an alternative network path to accommodate a link-failure case.

43. The method of claim 41, further comprising assigning a multicast address assigned to pre-computed network path to an alternative network path pre-computed to accommodate a link-failure case.

44. The method of claim 41, further comprising provisioning multicast routing paths to routers by creating routing tables in the network routers that cause the routers to route multicasting traffic according to the multicast addresses assigned to the pre-computed routes.

45. A multicasting network route provisioning method, comprising:

pre-computing network paths based on a network topology;

assigning different multicast addresses to the network paths;

selecting a path to route a multicasting session based on correspondence between a flow pattern of the session and the network path, wherein the flow pattern is defined in terms of a set of source and destination network nodes, and corresponds to multiple routing network paths; and determining whether a session requires a new path based on one or more of session performance feedback from a session participant and a new path request from the session participant.

46. The method of claim 45, further comprising pre-computing an alternative network path to accommodate a link-failure case.

47. The method of claim 45, further comprising assigning a multicast address assigned to pre-computed network path to an alternative network path pre-computed to accommodate a link-failure case.

48. The method of claim 45, further comprising provisioning multicast routing paths to routers by creating routing tables in the network routers that cause the routers to route multicasting traffic according to the multicast addresses assigned to the pre-computed routes.

49. A multicasting network route provisioning method, comprising:

pre-computing network paths based on a network topology;

assigning different multicast addresses to the network paths;

selecting a path to route a multicasting session based on correspondence between a flow pattern of the session and the network path, wherein the flow pattern is defined in terms of a set of source and destination network nodes, and corresponds to multiple routing network paths; and provisioning multicast routing paths to routers by creating in the network routers alternative routing tables with link-failure based access conditions that cause the routers to route multicasting traffic according to the multicast addresses assigned to the pre-computed routes in non-link-failure and link-failure cases.

50. The method of claim 49, further comprising pre-computing an alternative network path to accommodate a link-failure case.

51. The method of claim 49, further comprising assigning a multicast address assigned to pre-computed network path to an alternative network path pre-computed to accommodate a link-failure case.

52. The method of claim 49, further comprising provisioning multicast routing paths to routers by creating routing tables in the network routers that cause the routers to route multicasting traffic according to the multicast addresses assigned to the pre-computed routes.

* * * * *

UNITED STATES PATENT AND TRADEMARK OFFICE
CERTIFICATE OF CORRECTION

PATENT NO. : 6,950,432 B2  Page 1 of 1
DATED : September 27, 2005
INVENTOR(S) : Shiwen Chen et al.

It is certified that error appears in the above-identified patent and that said Letters Patent is hereby corrected as shown below:

Column 10,
Lines 9 and 12, "5" should be -- 11 --.

Signed and Sealed this

Twenty-first Day of March, 2006

JON W. DUDAS
*Director of the United States Patent and Trademark Office*